ns010871673B2

United States Patent
Dong et al.

(10) Patent No.: US 10,871,673 B2
(45) Date of Patent: Dec. 22, 2020

(54) DISPLAY SUBSTRATE AND DISPLAY APPARATUS

(71) Applicants: BEIJING BOE DISPLAY TECHNOLOGY CO., LTD., Beijing (CN); BOE Technology Group Co., Ltd., Beijing (CN)

(72) Inventors: Dianzheng Dong, Beijing (CN); Weitao Chen, Beijing (CN); Yu Ma, Beijing (CN); Yan Yan, Beijing (CN); Dade Sheng, Beijing (CN); Dongqi Chang, Beijing (CN)

(73) Assignees: BOE Technology Group Co., Ltd., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/612,325

(22) PCT Filed: Aug. 27, 2018

(86) PCT No.: PCT/CN2018/102503
§ 371 (c)(1),
(2) Date: Nov. 8, 2019

(87) PCT Pub. No.: WO2019/210629
PCT Pub. Date: Nov. 7, 2019

(65) Prior Publication Data
US 2020/0174309 A1    Jun. 4, 2020

(30) Foreign Application Priority Data

May 3, 2018    (CN) .......................... 2018 1 0415034

(51) Int. Cl.
*G02F 1/1335*    (2006.01)
*G02F 1/1333*    (2006.01)

(52) U.S. Cl.
CPC .................. *G02F 1/133512* (2013.01); *G02F 2001/133388* (2013.01); *G02F 2202/22* (2013.01)

(58) Field of Classification Search
CPC ... G02F 1/133512; G02F 2001/133388; G02F 2202/22
See application file for complete search history.

(56) References Cited

U.S. PATENT DOCUMENTS

2014/0133046 A1*    5/2014    Sung ..................... G02F 1/1335
                                                    359/893
2017/0160583 A1*    6/2017    Baek ................. G02F 1/133512
(Continued)

FOREIGN PATENT DOCUMENTS

CN        202631905 U    12/2012
CN        106226944 A    12/2016
(Continued)

OTHER PUBLICATIONS

International Search Report & Written Opinion dated Feb. 20, 2019, regarding PCT/CN2018/102503.
(Continued)

*Primary Examiner* — Jessica M Merlin
(74) *Attorney, Agent, or Firm* — Intellectual Valley Law, P.C.

(57) ABSTRACT

The present application provides a display substrate having a display area and a peripheral area. The display substrate includes a base substrate; a black matrix in the peripheral area on the base substrate; and an auxiliary black matrix in the peripheral area on the base substrate and spaced apart from the black matrix. The auxiliary black matrix is in an outer peripheral region of the peripheral area. The outer peripheral region is a region outside the black matrix and on
(Continued)

a side of a region in the peripheral area occupied by the black matrix distal to the display area.

19 Claims, 5 Drawing Sheets

(56) References Cited

U.S. PATENT DOCUMENTS

2019/0033654 A1  1/2019  Yuan et al.
2019/0310510 A1  10/2019  Chien

FOREIGN PATENT DOCUMENTS

| CN | 106773252 A | | 5/2017 |
|----|----|----|----|
| CN | 206162006 U | * | 5/2017 |
| CN | 206162006 U | | 5/2017 |
| CN | 107219692 A | | 9/2017 |
| CN | 206573816 U | | 10/2017 |
| CN | 107589588 A | | 1/2018 |
| CN | 107942570 A | | 4/2018 |
| JP | 2011170134 A | | 9/2011 |
| JP | 2014149546 A | | 8/2014 |

OTHER PUBLICATIONS

First Office Action in the Chinese Patent Application No. 201810415034.5, dated Apr. 30, 2019; English translation attached.
Second Office Action in the Chinese Patent Application No. 201810415034.5, dated Oct. 25, 2019; English translation attached.

* cited by examiner

DISPLAY SUBSTRATE AND DISPLAY APPARATUS

CROSS-REFERENCE TO RELATED APPLICATION

This application is a national stage application under 35 U.S.C. § 371 of International Application No. PCT/CN2018/102503, filed Aug. 27, 2018, which claims priority to Chinese Patent Application No. 201810415034.5, filed May 3, 2018, the contents of which are incorporated by reference in the entirety.

TECHNICAL FIELD

The present disclosure relates to display technology, more particularly, to a display substrate and a display apparatus.

BACKGROUND

Liquid crystal display devices have found a wide range of applications in display technology field. Typically, liquid crystal display devices include an array substrate and a package substrate (e.g., a color filter substrate) packaged together. The array substrate and the package substrate are fabricated separately, then assembled to produce a display panel. For efficiency consideration, production of the array substrate and the package substrate utilizes a mother substrate. Specifically, a plurality of array substrate units (or package substrate units) are formed on a single mother substrate. The mother substrate having the plurality of array substrate units and the mother substrate having the plurality of package substrate units are packaged together, thereby forming a mother substrate having a plurality of display panel units. The mother substrate having the plurality of display panel units is subsequently cut to obtain a plurality of display panels.

SUMMARY

In one aspect, the present invention provides a display substrate having a display area and a peripheral area, comprising a base substrate; a black matrix in the peripheral area on the base substrate; and an auxiliary black matrix in the peripheral area on the base substrate and spaced apart from the black matrix, the auxiliary black matrix being in an outer peripheral region of the peripheral area, the outer peripheral region being a region outside the black matrix and on a side of a region in the peripheral area occupied by the black matrix distal to the display area.

Optionally, the auxiliary black matrix substantially covers an entirety of the outer peripheral region.

Optionally, the black matrix substantially encircles the display area of the display substrate; and the auxiliary black matrix substantially encircles the black matrix.

Optionally, the auxiliary black matrix comprises a plurality of auxiliary black matrix blocks spaced apart from each other.

Optionally, gaps separating adjacent auxiliary black matrix blocks of the plurality of auxiliary black matrix blocks from each other comprise a plurality of first gap portions each of which having an elongated shape, a longitudinal direction of the elongated shape of the plurality of first gap portions substantially along a first direction; and the plurality of first gap portions have a misaligned arrangement in the display substrate along a second direction different from the first direction so that not all of the plurality of first gap portions are collinear along the first direction.

Optionally, gaps separating adjacent auxiliary black matrix blocks of the plurality of auxiliary black matrix blocks from each other further comprise a plurality of second gap portions each of which having an elongated shape, a longitudinal direction of the elongated shape of the plurality of second gap portions substantially along the second direction; and the plurality of second gap portions have a misaligned arrangement in the display substrate along the first direction so that not all of the plurality of second gap portions are collinear along the second direction.

Optionally, the plurality of auxiliary black matrix blocks constitute one or more groups of auxiliary black matrix blocks; each of the one or more groups of auxiliary black matrix blocks comprises a plurality of auxiliary black matrix clusters arranged in a repeating pattern in the display substrate; and each of the plurality of auxiliary black matrix clusters comprises one or more of the plurality of auxiliary black matrix blocks.

Optionally, at least two of the plurality of auxiliary black matrix blocks in a same one of the plurality of auxiliary black matrix clusters have different shapes.

Optionally, areas of multiple ones of the plurality of auxiliary black matrix blocks arranged along a direction from the display area to the peripheral area and in a same one of the plurality of auxiliary black matrix clusters sequentially decrease.

Optionally, gaps separating adjacent auxiliary black matrix blocks of the plurality of auxiliary black matrix blocks from each other comprise a plurality of first gap portions each of which having an elongated shape, a longitudinal direction of the elongated shape of the plurality of first gap portions substantially along a first direction; and first gap portions of the plurality of first gap portions in each of the one or more groups of auxiliary black matrix blocks have a misaligned arrangement in the display substrate along a second direction different from the first direction so that not all of the first gap portions of the plurality of first gap portions in a same group of the one or more groups of auxiliary black matrix blocks are collinear along the first direction.

Optionally, gaps separating adjacent auxiliary black matrix blocks of the plurality of auxiliary black matrix blocks from each other further comprise a plurality of second gap portions each of which having an elongated shape, a longitudinal direction of the elongated shape of the plurality of second gap portions substantially along the second direction; and second gap portions of the plurality of second gap portions in each of the one or more groups of auxiliary black matrix blocks have a misaligned arrangement in the display substrate along the first direction so that not all of the second gap portions of the plurality of second gap portions in a same group of the one or more groups of auxiliary black matrix blocks are collinear along the second direction.

Optionally, the plurality of auxiliary black matrix blocks constitute a plurality of circles of auxiliary black matrix blocks sequentially arranged along a direction from the display area to the peripheral area, each of the plurality of circles of auxiliary black matrix blocks comprising multiple ones of the plurality of auxiliary black matrix blocks arranged encircling the black matrix.

Optionally, the plurality of circles of auxiliary black matrix blocks comprise a first circle of auxiliary black matrix blocks and a second circle of auxiliary black matrix blocks directly adjacent to each other; adjacent auxiliary black matrix blocks in the first circle of auxiliary black matrix blocks form a plurality of first gaps; adjacent auxiliary black matrix blocks in the second circle of auxiliary black matrix blocks form a plurality of second gaps; and any individual one of the plurality of first gaps is misaligned with respect to any of the plurality of second gaps.

Optionally, areas of individual auxiliary black matrix blocks of the multiple ones of the plurality of auxiliary black matrix blocks in the plurality of circles of auxiliary black matrix blocks sequentially decrease along a direction from the display area to the peripheral area and across the plurality of circles of auxiliary black matrix blocks.

Optionally, the multiple ones of the plurality of auxiliary black matrix blocks in a same one of the plurality of circles of auxiliary black matrix blocks have a substantially same shape and dimension.

Optionally, the plurality of auxiliary black matrix blocks have a shape selected from a group consisting of a circular shape, a rectangular shape, a polygonal shape, and a mosaic shape.

Optionally, the black matrix has a plurality of recesses along an outer boundary of the black matrix on a side of the black matrix distal to the display area.

Optionally, at least a portion of each of the plurality of recesses has a stepped boundary.

Optionally, the plurality of auxiliary black matrix blocks covers greater than 70% of an entire area of the outer peripheral region.

In another aspect, the present invention provides a display apparatus comprising the display substrate described herein or fabricated by a method described herein.

BRIEF DESCRIPTION OF THE FIGURES

The following drawings are merely examples for illustrative purposes according to various disclosed embodiments and are not intended to limit the scope of the present disclosure.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Figure 1:
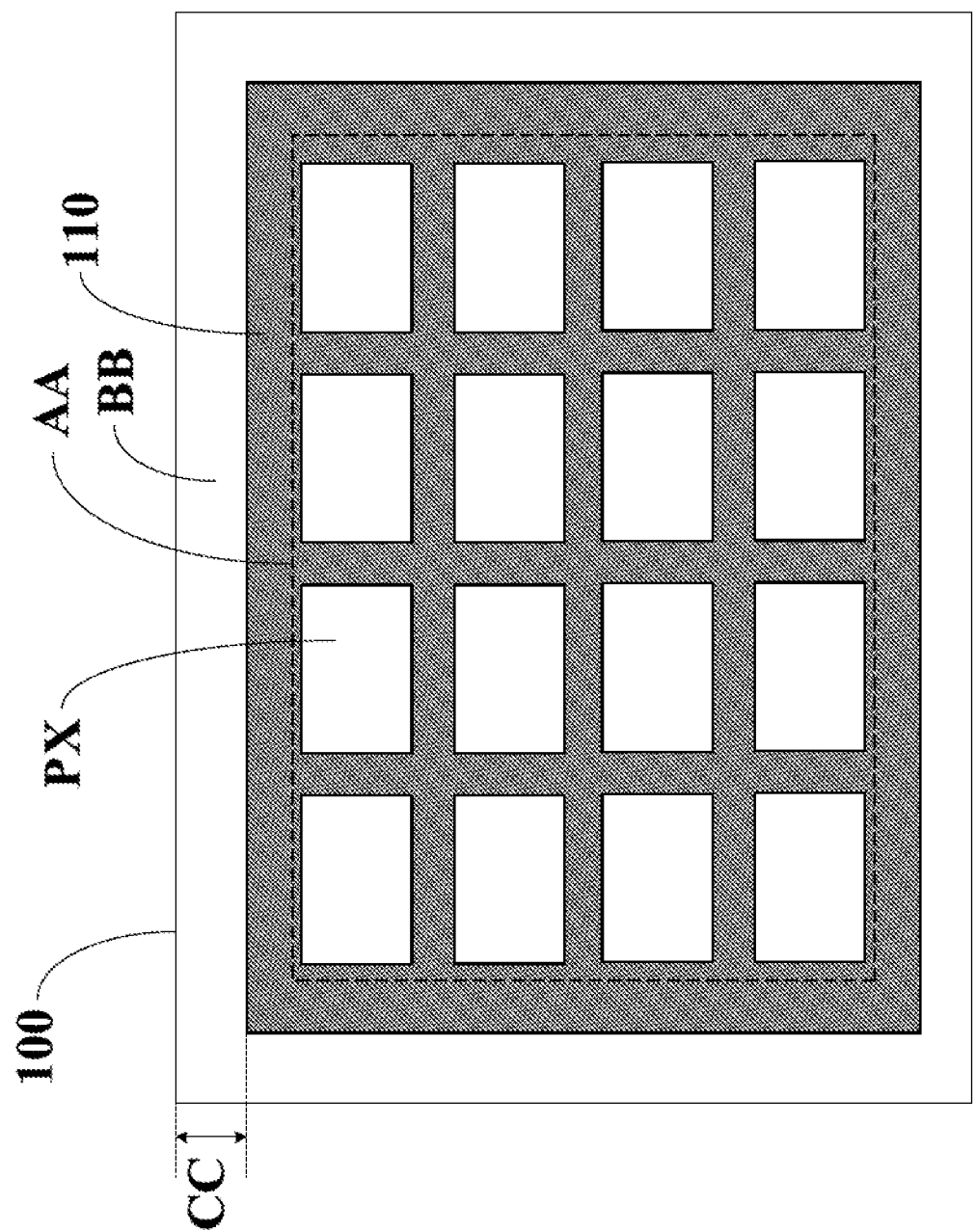
FIG. 1 is a schematic diagram illustrating the structure of a display substrate in some embodiments according to the present disclosure.

A display panel such as a liquid crystal display panel typically includes a counter substrate and an array substrate facing each other. To prevent light leakage, a black matrix is placed on one or both of the counter substrate and the array substrate. For example, the black matrix may be disposed on a side of the counter substrate facing the array substrate. Alternatively, the black matrix is disposed on a side of the array substrate facing the counter substrate. FIG. 1 is a schematic diagram illustrating the structure of a display substrate in some embodiments according to the present disclosure. Referring to FIG. 1, the display substrate (e.g., an array substrate) has a display area AA and a peripheral area BB. The black matrix 110 is disposed in part in the peripheral area BB and in part in the display area AA. In the display area AA, the black matrix 110 forms a mesh structure defining a plurality of pixel apertures PX. In the peripheral area, the black matrix 110 is a continuous structure for shielding light in the peripheral area BB. Typically, the black matrix 110 in the display area AA and the peripheral area BB constitutes an integral structure.

Typically, the black matrix 110 is made of low-resistance highly conductive material. When cut with a cutting tool or touch by a human part, static electricity is introduced into the black matrix 110. In a liquid crystal display panel, the introduced static electricity adversely affects the deflection of liquid crystal layer, resulting in display abnormality. Typically, in forming an array substrate, a mother substrate is used. The mother substrate includes a plurality of substrate regions, in each of which various layers of display components are formed. The mother substrate is then cut along cutting lines to form a plurality of independent array substrates. To avoid introduction of static electricity when the black matrix 110 is cut by a cutting tool, typically a blank region CC is reserved between an outer edge of the black matrix 110 and an outer edge of the base substrate 100. The blank region CC is substantially free of black material to avoid the black matrix from being cut. The blank region CC typically has a width of approximately 200 μm. When illuminated with a back light, a white line is visible in the peripheral area BB due to the light leakage in the blank region CC, affecting user viewing experience.

Accordingly, the present disclosure provides, inter alia, a display substrate and a display apparatus that substantially obviate one or more of the problems due to limitations and disadvantages of the related art. In one aspect, the present disclosure provides a display substrate. In some embodiments, the display substrate includes a base substrate; a black matrix in the peripheral area on the base substrate; and an auxiliary black matrix in the peripheral area on the base substrate and spaced apart from the black matrix, the auxiliary black matrix being in an outer peripheral region of the peripheral area, the outer peripheral region being a region outside the black matrix and on a side of a region in the peripheral area occupied by the black matrix distal to the display area.

As used herein the term "peripheral area" refers to an area of a display substrate (e.g., an opposing substrate or an array substrate) in a display panel where various circuits and wires are provided to transmit signals to the display substrate. To increase the transparency of the display apparatus, non-transparent or opaque components of the display apparatus (e.g., battery, printed circuit board, metal frame), can be disposed in the peripheral area rather than in the display areas. As used herein, the term "display area" refers to an area of a display substrate (e.g., an opposing substrate or an array substrate) in a display panel where image is actually displayed. Optionally, the display area may include both a subpixel region and an inter-subpixel region. A subpixel region refers to a light emission region of a subpixel, such as a region corresponding to a pixel electrode in a liquid crystal display or a region corresponding to a light emissive layer in an organic light emitting diode display panel. An inter-subpixel region refers to a region between adjacent subpixel regions, such as a region corresponding to a black matrix in a liquid crystal display or a region corresponding a pixel definition layer in an organic light emitting diode display panel. Optionally, the inter-subpixel region is a region between adjacent subpixel regions in a same pixel. Optionally, the inter-subpixel region is a region between two adjacent subpixel regions from two adjacent pixels.

In the present display substrate, the black matrix and the auxiliary black matrix on the base substrate substantially covers an entirety of the peripheral area other than gaps between the black matrix and the auxiliary black matrix and between adjacent auxiliary black matrix blocks of the plurality of auxiliary black matrix blocks. As used herein, the term "substantially" means and includes mostly, essentially, fully, or entirely. As used herein, the term "substantially covers" refers to one object or orthographic projection thereof being at least 50%, at least 60%, at least 70%, at least 80%, at least 90%, at least 95%, or at least 99%, covered by another object or orthographic projection thereof. By having an auxiliary black matrix, a white line in the peripheral area and static electricity can be avoided, greatly enhancing display quality.

Figure 2:
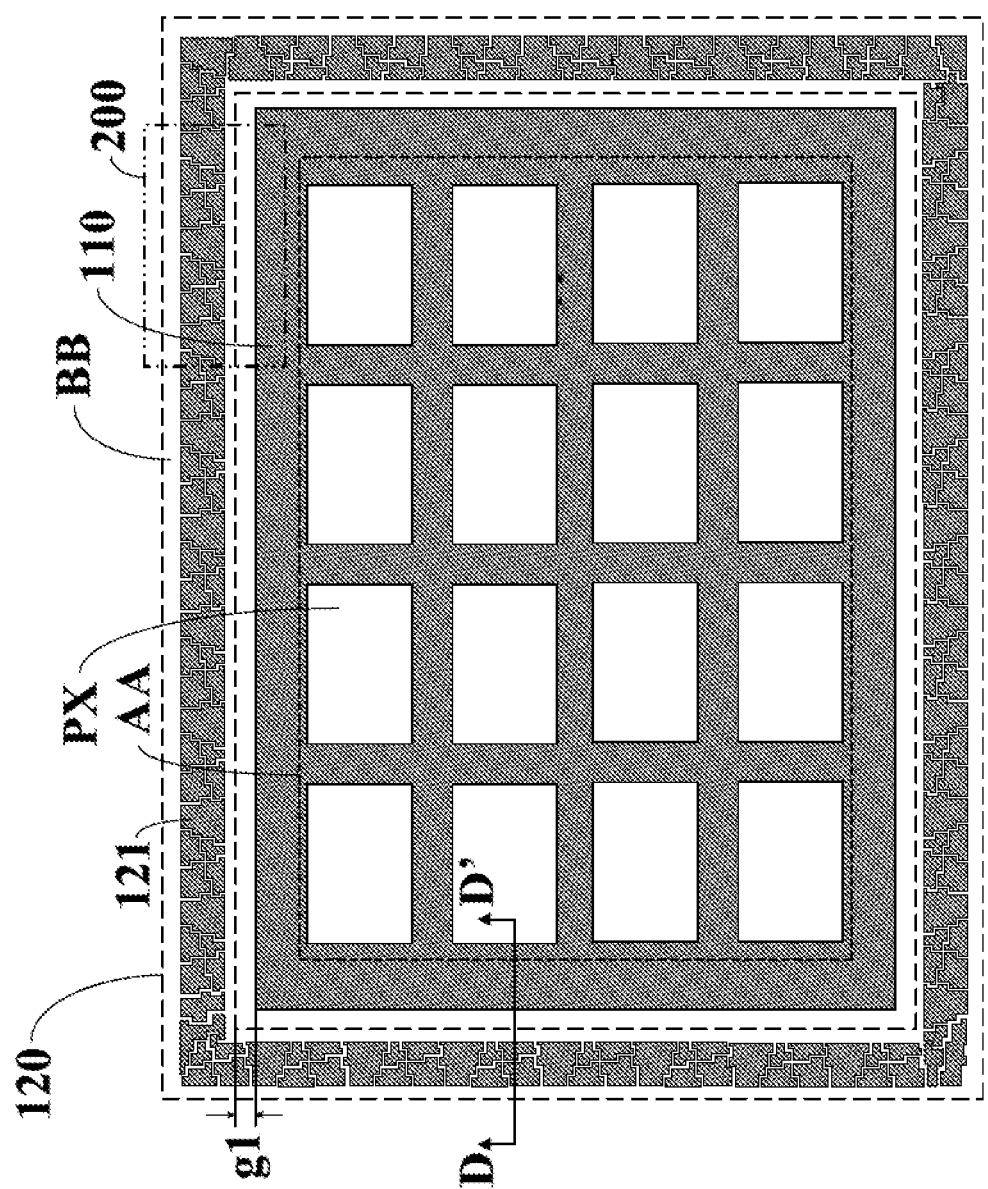
FIG. 2 is a schematic diagram illustrating the structure of a display substrate in some embodiments according to the present disclosure.
Figure 3:
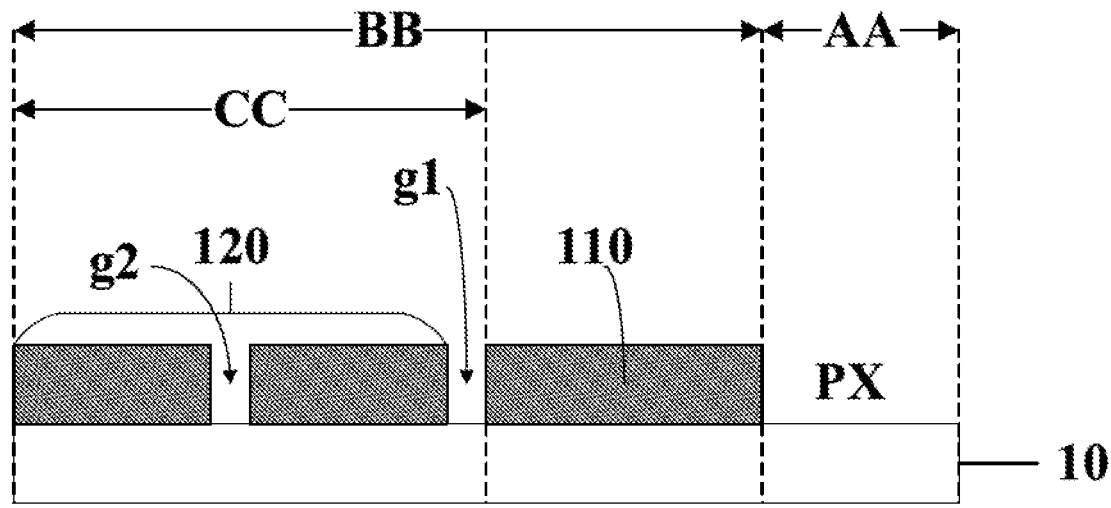
FIG. 3 is a cross-sectional view along D-D' line in FIG. 2.

FIG. 2 is a schematic diagram illustrating the structure of a display substrate in some embodiments according to the present disclosure. FIG. 3 is a cross-sectional view along D-D' line in FIG. 2. Referring to FIG. 2 and FIG. 3, the display substrate in some embodiments includes a base substrate 10, a black matrix 110 in the peripheral area BB on the base substrate 10, and an auxiliary black matrix 120 in the peripheral area BB on the base substrate 10 and spaced apart from the black matrix 110. The auxiliary black matrix 120 is in an outer peripheral region CC of the peripheral area BB, the outer peripheral region CC is a region outside the black matrix 110 and on a side of a region in the peripheral area BB occupied by the black matrix 110 distal to the display area AA. As shown in FIG. 2 and FIG. 3, the black matrix 110 and the auxiliary black matrix 120 substantially covers an entirety of the peripheral area BB. An outer edge of the base substrate 10 is completely covered by the auxiliary black matrix 120, e.g., there is no black region in the peripheral area BB. Optionally, a combination of the black matrix 110 and the auxiliary black matrix 120 covers at least 70% (e.g., at least 75%, at least 80%, at least 85%, at least 90%, at least 95%, or more) of the entirety of the peripheral area BB.

Referring to FIG. 2 and FIG. 3, the auxiliary black matrix 120 in some embodiments includes a plurality of auxiliary black matrix blocks 121 spaced apart from each other. Optionally, the black matrix 110 and the auxiliary black matrix 120 in some embodiments substantially covers an entirety of the peripheral area BB other than a gap g1 between the black matrix 110 and the auxiliary black matrix 120. Optionally, the black matrix 110 and the auxiliary black matrix 120 in some embodiments substantially covers an entirety of the peripheral area BB other than a gap g1 between the black matrix 110 and the auxiliary black matrix 120 and gaps g2 between adjacent auxiliary black matrix blocks of the plurality of auxiliary black matrix blocks 121. Optionally, the gap g1 occupies less than 30% (e.g., less than 25%, less than 20%, less than 15%, less than 10%, less than 5%) of a total area of the peripheral area BB. Optionally, the gap g1 and gaps g2 occupy less than 30% (e.g., less than 25%, less than 20%, less than 15%, less than 10%, less than 5%) of a total area of the peripheral area BB. Optionally, the auxiliary black matrix 120 in some embodiments substantially covers an entirety of the outer peripheral region CC other than that gap g1 between the black matrix 110 and the auxiliary black matrix 120. Optionally, the auxiliary black matrix 120 in some embodiments substantially covers an entirety of the outer peripheral region CC other than that gap g1 between the black matrix 110 and the auxiliary black matrix 120 and the gaps g2 between adjacent auxiliary black matrix blocks of the plurality of auxiliary black matrix blocks 121. Optionally, the gap g1 occupies less than 30% (e.g., less than 25%, less than 20%, less than 15%, less than 10%, less than 5%) of a total area of the outer peripheral region CC. Optionally, the gap g1 and gaps g2 occupy less than 30% (e.g., less than 25%, less than 20%, less than 15%, less than 10%, less than 5%) of a total area of the outer peripheral region CC.

Referring to FIG. 2, in some embodiments, the black matrix 110 substantially encircles the display area AA of the display substrate, and optionally, the auxiliary black matrix 120 substantially encircles the black matrix 110. As used herein, the term "encircle" refers to "to pass completely around." The term encircle is not limited to mean literally forming a circle, although it may include forming a circle, but may also include entirely or partially forming a perimeter around, entirely or partially surrounding, and/or being located at near an entire or partial periphery of that which is being encircled. In some embodiments, the black matrix 110 substantially surrounds the display area AA of the display substrate, and optionally, the auxiliary black matrix 120 substantially surrounds the black matrix 110. As used herein the term "substantially surround" refers to surrounding at least 50% (e.g., at least 60%, at least 70%, at least 80%, at least 90%, at least 95%, at least 99%, and 100%) of a perimeter of an area.

By having an auxiliary black matrix 120 in the present display substrate, the white line in the outer peripheral region CC can be eliminated, enhancing display quality. By having the auxiliary black matrix 120 spaced apart from the black matrix 110, static electricity introduced during cutting of the auxiliary black matrix 120 will not be transmitted into the black matrix 110, thereby avoiding display abnormalities caused by the static electricity.

Optionally, the gap g1 has a lateral distance between the black matrix 110 and the auxiliary black matrix 120 in a range of approximately 0.1 μm to approximately 100 μm, e.g., approximately 0.1 μm to approximately 50 μm, approximately 0.1 μm to approximately 25 μm, approximately 1 μm to approximately 20 μm, approximately 1 μm to approximately 15 μm, approximately 5 μm to approximately 15 μm, and approximately 7.5 μm to approximately 12.5 μm. Optionally, the lateral distance between the black matrix 110 and the auxiliary black matrix 120 of the gap g1 is approximately 10 μm.

Optionally, the auxiliary black matrix 120 is an integral structure.

Optionally, the auxiliary black matrix 120 includes a plurality of auxiliary black matrix blocks 121 spaced apart from each other, as shown in FIG. 2. By having the plurality of auxiliary black matrix blocks 121, an improved blanking effect can be achieved in the display substrate. Moreover, when the auxiliary black matrix 120 is cut, because the plurality of auxiliary black matrix blocks 121 are spaced apart from each other, fragments from cutting one or more of the plurality of auxiliary black matrix blocks 121 will not affect other blocks of the plurality of auxiliary black matrix blocks 121 spaced apart therefrom. Static electricity and adverse effects thereof can be further prevented.

Various appropriate flexible materials may be used for making the base substrate 10. Examples of appropriate materials for making the base substrate 10 include glass, silicon, quartz, and flexible materials such as polyimide, polycarbonate, polyethersulfone, polyethylene terephthalate, polyethylene naphthalate, polyarylate, and fiber-reinforced plastic. Optionally, the base substrate 10 is a transparent base substrate.

Optionally, the display substrate is an array substrate. Optionally, the display substrate is a counter substrate such as a color filter substrate.

Referring to FIG. 2 and FIG. 3, the auxiliary black matrix 120 includes a plurality of auxiliary black matrix blocks 121 spaced apart from each other. Adjacent auxiliary black matrix blocks of the plurality of auxiliary black matrix blocks 121 are spaced apart from each other by gaps g2.

Figure 4:
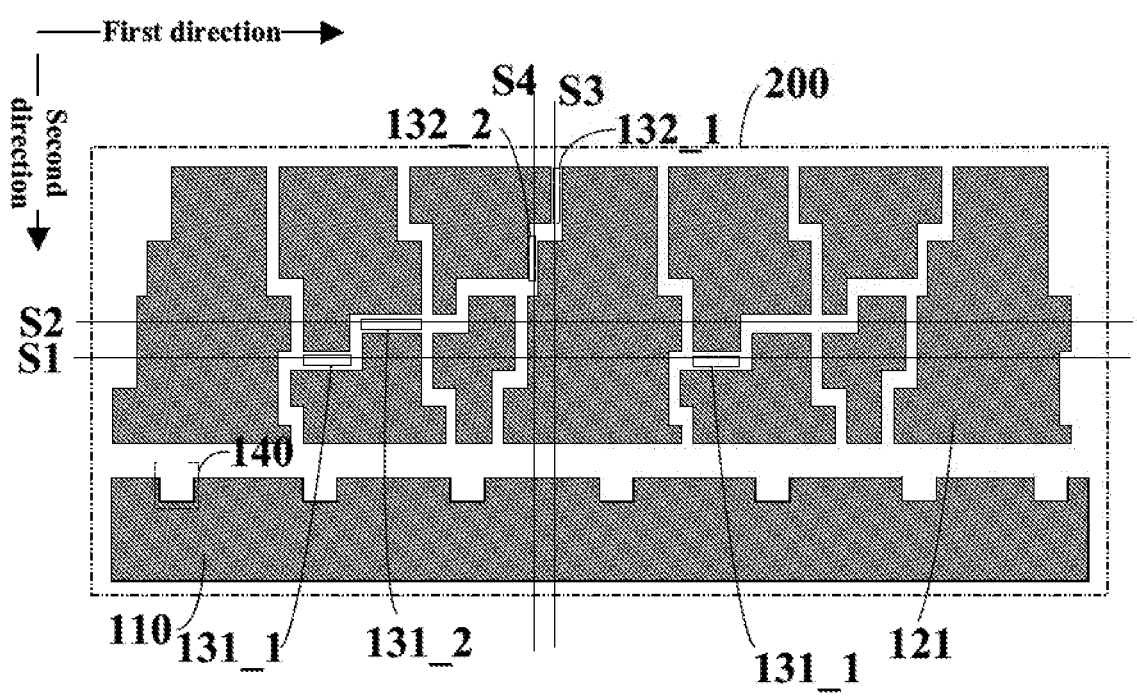
FIG. 4 is a zoom-in view of a region 200 in FIG. 2.

In some embodiments, portions of the second gaps have a misaligned arrangement to further improve blanking effect of the display substrate. FIG. 4 is a zoom-in view of a region 200 in FIG. 2. Referring to FIG. 4, the gaps separating adjacent auxiliary black matrix blocks of the plurality of auxiliary black matrix blocks 121 from each other include a plurality of first gap portions each of which having an elongated shape, a longitudinal direction of the elongated shape of the plurality of first gap portions substantially along a first direction. FIG. 4 shows examples of the plurality of first gap portions including a first gap portion 131_1 and a first gap portion 131_2. As shown in FIG. 4, the plurality of first gap portions have a misaligned arrangement in the display substrate along a second direction different from the first direction so that not all of the plurality of first gap portions are collinear along the first direction. In one example, the first gap portion 131_1 is collinear with a straight line S1, and the first gap portion 131_2 is collinear with a straight line S2. The straight line S1 and the straight line S2 are two separate lines, e.g., non-collinear. By having the plurality of first gap portions in a misaligned arrangement, an enhanced blanking effect can be achieved.

Optionally, and referring to FIG. 4 again, the gaps separating adjacent auxiliary black matrix blocks of the plurality of auxiliary black matrix blocks 121 from each other further include a plurality of second gap portions each of which having an elongated shape, a longitudinal direction of the elongated shape of the plurality of second gap portions substantially along the second direction. FIG. 4 shows examples of the plurality of second gap portions including a second gap portion 132_1 and a second gap portion 132_2. As shown in FIG. 4, the plurality of second gap portions have a misaligned arrangement in the display substrate along the first direction different from the second direction so that not all of the plurality of second gap portions are collinear along the second direction. In one example, the second gap portion 132_1 is collinear with a straight line S3, and the second gap portion 132_2 is collinear with a straight line S4. The straight line S3 and the straight line S4 are two separate lines, e.g., non-collinear. By having the plurality of second gap portions in a misaligned arrangement, an enhanced blanking effect can be achieved.

Optionally, the plurality of first gap portions have a misaligned arrangement in the display substrate along a second direction different from the first direction so that not all of the plurality of first gap portions are collinear along the first direction; and the plurality of second gap portions have a misaligned arrangement in the display substrate along the first direction different from the second direction so that not all of the plurality of second gap portions are collinear along the second direction. As shown in FIG. 4, the plurality of first gap portions, such as the first gap portion 131_1 and the first gap portion 131_2, have a misaligned arrangement in the display substrate along a second direction different from the first direction so that not all of the plurality of first gap portions are collinear along the first direction; and the plurality of second gap portions, such as the second gap portion 132_1 and the second gap portion 132_2, have a misaligned arrangement in the display substrate along the first direction different from the second direction so that not all of the plurality of second gap portions are collinear along the second direction.

Optionally, the first direction is a row direction, and the second direction is a column direction. Optionally, the first direction is substantially parallel to an outer boundary of the black matrix 110, and the second direction is along a direction from the display area to the peripheral area. Optionally, the first direction and the second direction are non-parallel to the outer boundary of the black matrix 110, but at an inclined angle with respect to the outer boundary of the black matrix 110.

In some embodiments, the plurality of auxiliary black matrix blocks 121 have a repeating pattern, e.g., the plurality of auxiliary black matrix blocks 121 have a substantially same shape and dimension. In some embodiments, the plurality of auxiliary black matrix blocks 121 have different shapes and dimensions.

Figure 5:
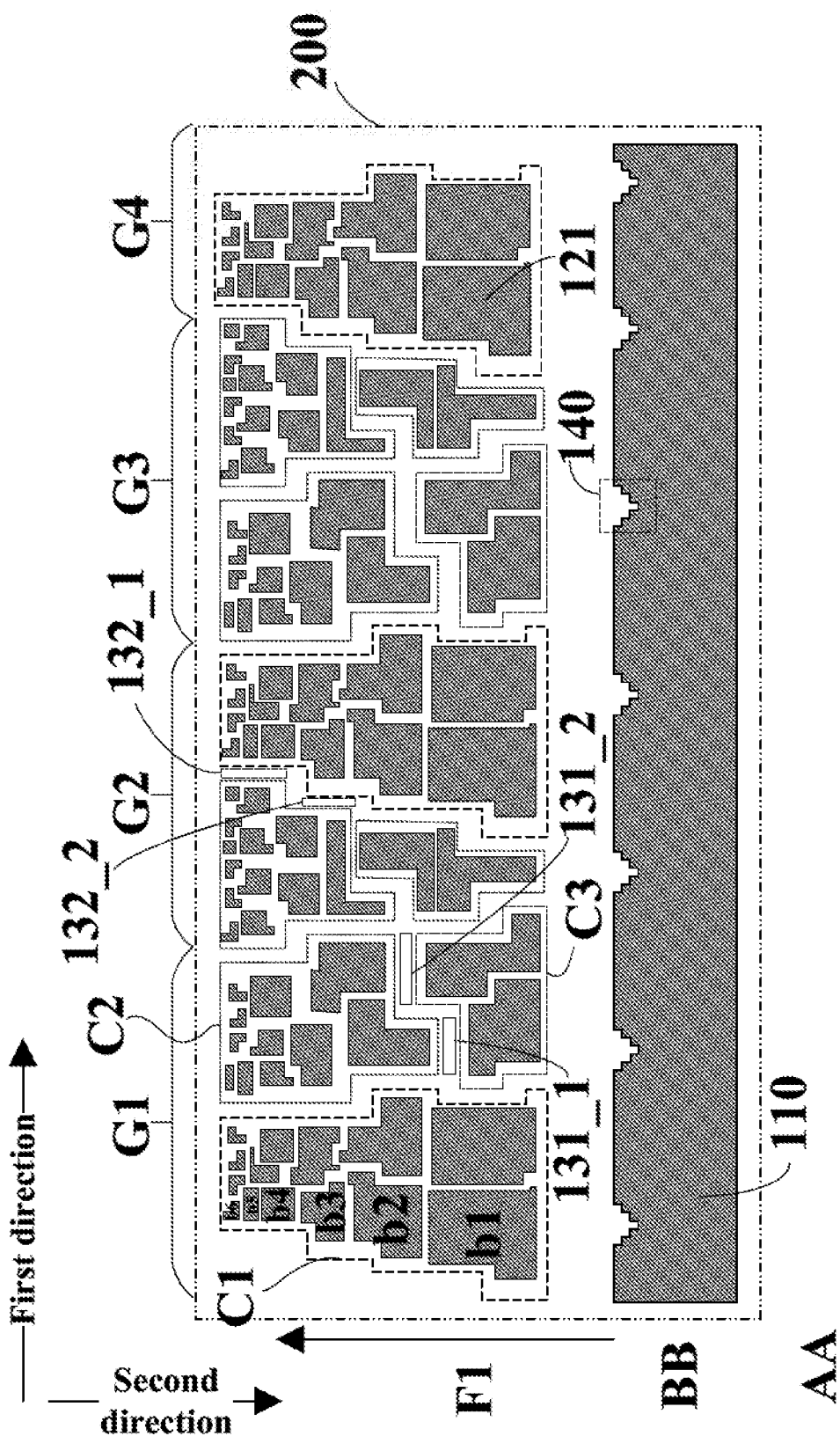
FIG. 5 is a zoom-in view of a region 200 in FIG. 2.

In some embodiments, the plurality of auxiliary black matrix blocks 121 constitute one or more groups of auxiliary black matrix blocks. FIG. 5 is a zoom-in view of a region 200 in FIG. 2. Referring to FIG. 5, the plurality of auxiliary black matrix blocks 121 constitute a plurality of groups of auxiliary black matrix blocks, including a first group G1, a second group G2, a third group G3, and a fourth group G4. Each of the one or more groups of auxiliary black matrix blocks includes a plurality of auxiliary black matrix clusters, and the plurality of auxiliary black matrix clusters are arranged in a repeating pattern in the display substrate. Referring to FIG. 5, each of the one or more groups of auxiliary black matrix blocks includes a first cluster C1, a second cluster C2, and a third cluster C3. The first cluster C1 is arranged in a repeating pattern in the display substrate, for example, each of the first group G1, the second group G2, the third group G3, and the fourth group G4, includes the first cluster C1. Similarly, the second cluster C2 is arranged in a repeating pattern in the display substrate, the third cluster C3 is arranged in a repeating pattern in the display substrate, and the fourth cluster C4 is arranged in a repeating pattern in the display substrate. Each of the plurality of auxiliary black matrix clusters includes one or more of the plurality of auxiliary black matrix blocks 121.

Optionally, at least two of the plurality of auxiliary black matrix blocks 121 in a same one of the plurality of auxiliary black matrix clusters have different shapes. For example, at least two (optionally all) of the plurality of auxiliary black matrix blocks 121 in the first cluster C1 have different shapes (and dimensions), at least two (optionally all) of the plurality of auxiliary black matrix blocks 121 in the second cluster C2 have different shapes (and dimensions), and at least two (optionally all) of the plurality of auxiliary black matrix blocks 121 in the third cluster C3 have different shapes (and dimensions).

Optionally, at least two of the plurality of auxiliary black matrix blocks 121 in a same one of the plurality of auxiliary black matrix clusters have a substantially same shape.

Optionally, the one or more groups of auxiliary black matrix blocks (e.g., the first group G1, the second group G2, the third group G3, and the fourth group G4) have a repeating pattern. For example, the one or more groups of auxiliary black matrix blocks are substantially the same, and have translational symmetry.

Referring to FIG. 5, gaps separating adjacent auxiliary black matrix blocks of the plurality of auxiliary black matrix blocks 121 from each other include a plurality of first gap portions each of which having an elongated shape, a longitudinal direction of the elongated shape of the plurality of first gap portions (e.g., the first gap portion 131_1 and the first gap portion 131_2) substantially along a first direction. First gap portions of the plurality of first gap portions in each of the one or more groups of auxiliary black matrix blocks have a misaligned arrangement in the display substrate along the second direction so that not all of the first gap portions of the plurality of first gap portions in a same group of the one or more groups of auxiliary black matrix blocks are collinear along the first direction. Optionally, the first gap portions of the plurality of first gap portions in the same group of the one or more groups of auxiliary black matrix blocks are all non-collinear with respect to each other. For example, the first gap portions of the plurality of first gap portions in the first group G1 are all non-collinear with respect to each other.

Optionally, first gap portions of the plurality of first gap portions in each of the plurality of auxiliary black matrix clusters of each of the one or more groups of auxiliary black matrix blocks have a misaligned arrangement in the display substrate along the second direction so that not all of the first gap portions of the plurality of first gap portions in a same cluster of the plurality of auxiliary black matrix clusters of each of the one or more groups of auxiliary black matrix blocks are collinear along the first direction. For example, the first gap portions of the plurality of first gap portions in the first cluster C1 are all non-collinear with respect to each other.

Referring to FIG. 5, gaps separating adjacent auxiliary black matrix blocks of the plurality of auxiliary black matrix blocks 121 from each other further include a plurality of second gap portions each of which having an elongated shape, a longitudinal direction of the elongated shape of the plurality of second gap portions (e.g., the second gap portion 132_1 and the second gap portion 132_2) substantially along the second direction. Second gap portions of the plurality of second gap portions in each of the one or more groups of auxiliary black matrix blocks have a misaligned arrangement in the display substrate along the first direction so that not all of the second gap portions of the plurality of second gap portions in a same group of the one or more groups of auxiliary black matrix blocks are collinear along the second direction. Optionally, the second gap portions of the plurality of second gap portions in a same group of the one or more groups of auxiliary black matrix blocks are all non-collinear with respect to each other.

Optionally, second gap portions of the plurality of second gap portions in each of the plurality of auxiliary black matrix clusters of each of the one or more groups of auxiliary black matrix blocks have a misaligned arrangement in the display substrate along the first direction so that not all of the second gap portions of the plurality of second gap portions in a same cluster of the plurality of auxiliary black matrix clusters of each of the one or more groups of auxiliary black matrix blocks are collinear along the second direction. Optionally, the second gap portions of the plurality of second gap portions in a same cluster of the plurality of auxiliary black matrix clusters of each of the one or more groups of auxiliary black matrix blocks are all non-collinear with respect to each other. For example, the second gap portions of the plurality of second gap portions in the first cluster C1 are all non-collinear with respect to each other.

In some embodiments, areas of multiple ones of the plurality of auxiliary black matrix blocks 121 arranged along a direction F1 from the display area AA to the peripheral area BB sequentially decrease. Referring to FIG. 5, areas of multiple ones of the plurality of auxiliary black matrix blocks 121 arranged along a direction F1 from the display area AA to the peripheral area BB and in the same one of the plurality of auxiliary black matrix clusters sequentially decrease. Optionally, areas of multiple ones of the plurality of auxiliary black matrix blocks 121 arranged along a direction F1 from the display area AA to the peripheral area BB and in the same group of the one or more groups of auxiliary black matrix blocks sequentially decrease. As shown in FIG. 5, the blocks b1 to b6 are sequentially arranged along the direction F1 (a direction from the display area AA to the peripheral area BB), areas of the blocks b1 to b6 sequentially decrease along the direction F1. By having this design, the blanking effect can be further enhanced.

In some embodiments, to further enhance the blanking effect, the black matrix 110 has a plurality of recesses 140 along an outer boundary of the black matrix 110 on a side of the black matrix 110 distal to the display area AA. For example, the outer boundary of the black matrix 110 is a serrated boundary, the edge of the black matrix 110 has concaved portions and convex portions alternately arranged. Accordingly, the outer boundary of the black matrix 110 does not appear as a substantially straight line, thereby further enhancing the blanking effect. Optionally, the plurality of recesses 140 are distributed evenly along the outer boundary of the black matrix 110, e.g., adjacent recesses of the plurality of recesses 140 are spaced apart by a substantially same distance. Optionally, the plurality of recesses 140 are distributed unevenly along the outer boundary of the black matrix 110.

In some embodiments, to further enhance the blanking effect, at least a portion of each of the plurality of recesses 140 has a stepped boundary. As shown in FIG. 5, along a direction from a bottom side of a respective one of the plurality of recesses 140 to an open side of the respective one of the plurality of recesses 140, the respective one of the plurality of recesses 140 has a stepped boundary.

The plurality of auxiliary black matrix blocks 121 may have various appropriate shapes and dimensions. In some embodiments, the plurality of auxiliary black matrix blocks 121 have a shape selected from a group consisting of a circular shape, a rectangular shape, a polygonal shape, and a mosaic shape.

Optionally, the black matrix 110 and the auxiliary black matrix 120 are in a same layer, e.g., fabricated in a same patterning process using a same mask plate and optionally using a same black material. As used herein, the term "same layer" refers to the relationship between the layers simultaneously formed in the same step. In one example, the black matrix 110 and the auxiliary black matrix 120 are in a same layer when they are formed as a result of one or more steps of a same patterning process performed in a same layer of material. In another example, the black matrix 110 and the auxiliary black matrix 120 can be formed in a same layer by simultaneously performing the step of forming the black matrix 110 and the step of forming the auxiliary black matrix 120. The term "same layer" does not always mean that the thickness of the layer or the height of the layer in a cross-sectional view is the same.

Optionally, the black matrix 110 and the auxiliary black matrix 120 are made of different materials. In one example, the black matrix 110 and the auxiliary black matrix 120 are formed in two different patterning processes.

Various appropriate black materials and various appropriate fabricating methods may be used to make the black matrix 110 and the auxiliary black matrix 120. For example, a black material may be deposited on the substrate (e.g., by sputtering, vapor deposition, solution coating, or spin coating); and patterned (e.g., by lithography such as a wet etching process) to form the conductive material layer. Examples of appropriate black materials for making the black matrix 110 and the auxiliary black matrix 120 include, but are not limited to, organic or inorganic black materials such as carbon, a metal or metal oxide (e.g., molybdenum, chromium, or chromium oxide), chromium organic black materials, graphite, a pigment-containing resin.

Figure 6:
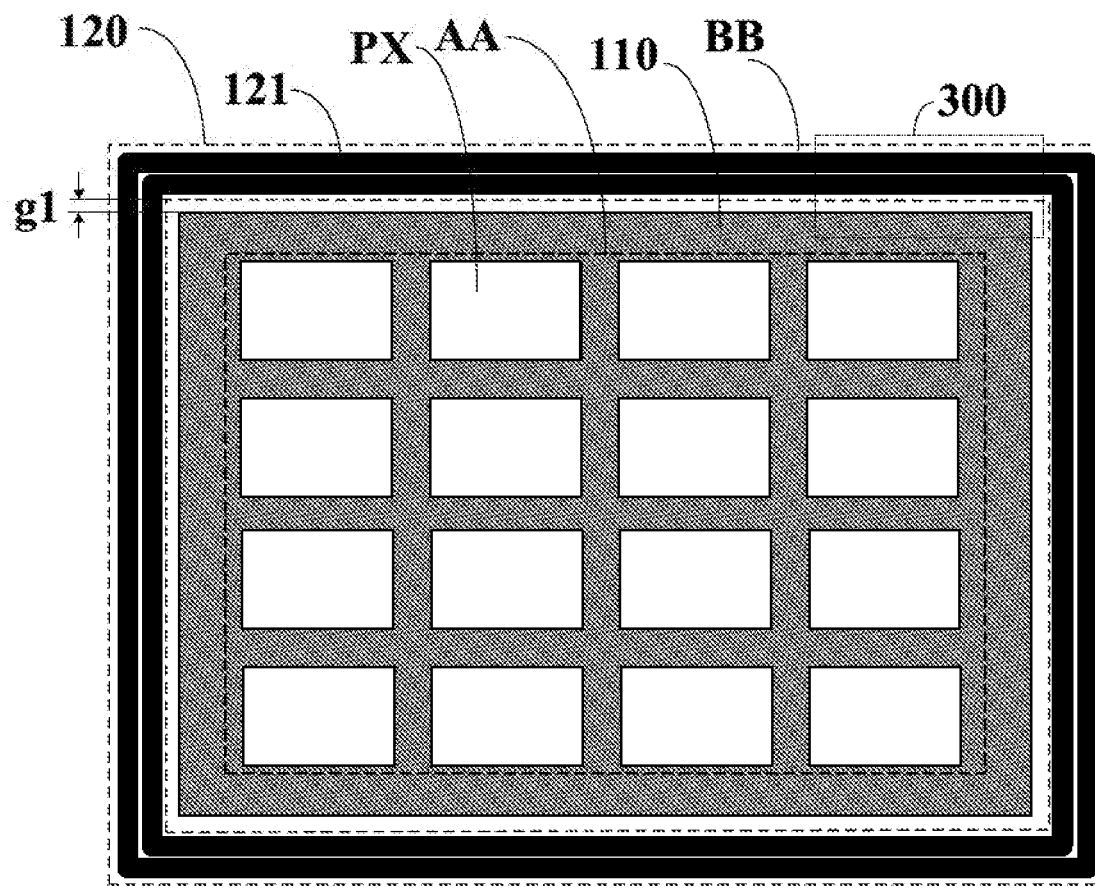
FIG. 6 is a schematic diagram illustrating the structure of a display substrate in some embodiments according to the present disclosure.

FIG. 6 is a schematic diagram illustrating the structure of a display substrate in some embodiments according to the present disclosure. Referring to FIG. 6, in some embodiments, the plurality of auxiliary black matrix blocks 121 constitute a plurality of circles of auxiliary black matrix blocks sequentially arranged along a direction from the display area AA to the peripheral area BB. For example, FIG. 6 shows two circles, each circle includes one continuous auxiliary black matrix block. By arranging the plurality of auxiliary black matrix blocks 121 in circles, the blanking effect can be further enhanced. During the cutting process to form the display substrate, the auxiliary black matrix block in outer circles may be broken. Because the plurality of circles of auxiliary black matrix blocks are spaced apart from each other and spaced apart from the black matrix 110. The fragments of the auxiliary black matrix block will not adversely affect the other parts of the display substrate.

Figure 7:
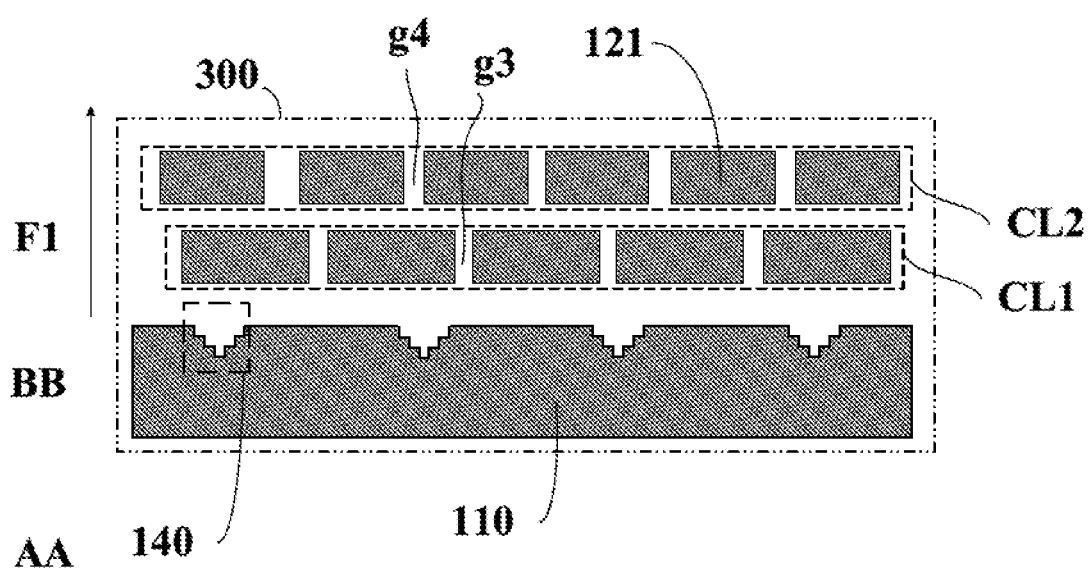
FIG. 7 is a zoom-in view of a region 300 in FIG. 2.

FIG. 7 is a zoom-in view of a region 300 in FIG. 2. Referring to FIG. 7, in some embodiments, each of the plurality of circles of auxiliary black matrix blocks includes multiple ones of the plurality of auxiliary black matrix blocks 121 arranged encircling the black matrix 110. For example, FIG. 7 shows two circles of auxiliary black matrix blocks, a first circle of auxiliary black matrix blocks CL1 and a second circle of auxiliary black matrix blocks CL2. The first circle of auxiliary black matrix blocks CL1 and the second circle of auxiliary black matrix blocks CL2 are sequentially arranged along a direction F1 from the display area AA to the peripheral area BB, and they are directly adjacent to each other.

In some embodiments, the plurality of auxiliary black matrix blocks 121 in the first circle of auxiliary black matrix blocks CL1 are misaligned with respect to the plurality of auxiliary black matrix blocks 121 in the second circle of auxiliary black matrix blocks CL2. Specifically, adjacent auxiliary black matrix blocks in the first circle of auxiliary black matrix blocks CL1 form a plurality of third gaps g3, adjacent auxiliary black matrix blocks in the second circle of auxiliary black matrix blocks CL2 form a plurality of fourth gaps g4. Any individual one of the plurality of third gaps g3 is misaligned with respect to any of the plurality of fourth gaps g4. Any individual one of the plurality of fourth gaps g4 is misaligned with respect to any of the plurality of third gaps g3. None of the plurality of third gaps g3 is collinear with any of the plurality of fourth gaps g4, and none of the plurality of fourth gaps g4 is collinear with any of the plurality of third gaps g3. This structure significantly enhances the blanking effect of the display substrate.

In some embodiments, areas of individual auxiliary black matrix blocks of the multiple ones of the plurality of auxiliary black matrix blocks 121 in the plurality of circles of auxiliary black matrix blocks sequentially decrease along the direction F1 from the display area AA to the peripheral area BB and across the plurality of circles of auxiliary black matrix blocks. For example, and as shown in FIG. 7, each of the plurality of auxiliary black matrix blocks 121 in the second circle of auxiliary black matrix blocks CL2 has an area smaller than an area of any one of the plurality of auxiliary black matrix blocks 121 in the first circle of auxiliary black matrix blocks CL. The areas of the plurality of auxiliary black matrix blocks 121 gradually decrease along the direction F1, further enhancing the blanking effect.

In some embodiments, the multiple ones of the plurality of auxiliary black matrix blocks 121 in a same one of the plurality of circles of auxiliary black matrix blocks have a substantially same shape and dimension. For example, the multiple ones of the plurality of auxiliary black matrix blocks 121 in the first circle of auxiliary black matrix blocks CL1 all have a substantially same shape and dimension with respect to each other. Similarly, the multiple ones of the plurality of auxiliary black matrix blocks 121 in the second circle of auxiliary black matrix blocks CL2 all have a substantially same shape and dimension with respect to each other.

In some embodiments, to further enhance the blanking effect, the black matrix 110 has a plurality of recesses 140 along an outer boundary of the black matrix 110 on a side of the black matrix 110 distal to the display area AA. For example, the outer boundary of the black matrix 110 is a serrated boundary, the edge of the black matrix 110 has concaved portions and convex portions alternately arranged. Accordingly, the outer boundary of the black matrix 110 does not appear as a substantially straight line, thereby further enhancing the blanking effect. Optionally, the plurality of recesses 140 are distributed evenly along the outer boundary of the black matrix 110, e.g., adjacent recesses of the plurality of recesses 140 are spaced apart by a substantially same distance. Optionally, the plurality of recesses 140 are distributed unevenly along the outer boundary of the black matrix 110.

In some embodiments, to further enhance the blanking effect, at least a portion of each of the plurality of recesses 140 has a stepped boundary. As shown in FIG. 5, along a direction from a bottom side of a respective one of the plurality of recesses 140 to an open side of the respective one of the plurality of recesses 140, the respective one of the plurality of recesses 140 has a stepped boundary.

The plurality of auxiliary black matrix blocks 121 may have various appropriate shapes and dimensions. In some embodiments, the plurality of auxiliary black matrix blocks 121 have a shape selected from a group consisting of a circular shape, a rectangular shape, a polygonal shape, and a mosaic shape.

Optionally, the black matrix 110 and the auxiliary black matrix 120 are in a same layer, e.g., fabricated in a same patterning process using a same mask plate and optionally using a same black material.

In another aspect, the present disclosure provides a display apparatus including a display substrate described herein. Examples of appropriate display apparatuses include, but are not limited to, an electronic paper, a mobile phone, a tablet computer, a television, a monitor, a notebook computer, a digital album, a GPS, etc. Optionally, the display apparatus is a liquid crystal display apparatus. Optionally, the display apparatus is an organic light emitting diode display apparatus.

In another aspect, the present disclosure provides a method of fabricating a display substrate. In some embodiments, the method includes forming a black matrix in the peripheral area on a base substrate; and forming an auxiliary black matrix in the peripheral area on the base substrate. The auxiliary black matrix is formed to be spaced apart from the black matrix. The auxiliary black matrix is formed in an outer peripheral region of the peripheral area. The outer peripheral region is a region outside the black matrix and on a side of the black matrix distal to the display area.

The foregoing description of the embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. A display substrate having a display area and a peripheral area, comprising:
    a base substrate;
    a black matrix in the peripheral area on the base substrate; and
    an auxiliary black matrix in the peripheral area on the base substrate and spaced apart from the black matrix by a main gap, the auxiliary black matrix being in an outer peripheral region of the peripheral area, the outer peripheral region being a region outside the black matrix and on a side of a region in the peripheral area occupied by the black matrix distal to the display area;
    wherein the auxiliary black matrix comprises a plurality of auxiliary black matrix blocks spaced apart from each other;
    gaps separating adjacent auxiliary black matrix blocks of the plurality of auxiliary black matrix blocks from each other comprise a plurality of first gap portions, a respective one of which having a first elongated shape, a longitudinal direction of the first elongated shape of the plurality of first gap portions substantially along a first direction;
    gaps separating adjacent auxiliary black matrix blocks of the plurality of auxiliary black matrix blocks from each other further comprise a plurality of second gap portions, a respective one of which having a second elongated shape, a longitudinal direction of the second elongated shape of the plurality of second gap portions substantially along the second direction;
    the plurality of first gap portions and the plurality of second gap portions form an inter-connected gap network independent of the main gap;
    two directly adjacent first gap portions of the plurality of first gap portions that are not directly connected by the main gap are connected by one of the plurality of second gap portions;
    two directly adjacent second gap portions of the plurality of second gap portions that are not directly connected by the main gap are connected by one of the plurality of first gap portions;
    a first total number of auxiliary black matrix blocks per first unit area is greater than a second total number of auxiliary black matrix blocks per second unit area, the first unit area and the second unit area having a same size, the second unit area being closer to the display area than the first unit area; and
    a first area of a first respective one of the plurality of auxiliary black matrix blocks is smaller than a second area of a second respective one of the plurality of auxiliary black matrix blocks, the second respective one of the plurality of auxiliary black matrix blocks being closer to the display area than the first respective one of the plurality of auxiliary black matrix blocks.

2. The display substrate of claim 1, wherein the auxiliary black matrix covers at least 90% of the outer peripheral region.

3. The display substrate of claim 1, wherein the black matrix substantially encircles the display area of the display substrate; and
    the auxiliary black matrix substantially encircles the black matrix.

4. The display substrate of claim 1, wherein
    the plurality of first gap portions have a misaligned arrangement in the display substrate along a second direction different from the first direction so that not all of the plurality of first gap portions are collinear along the first direction.

5. The display substrate of claim 4, wherein
    the plurality of second gap portions have a misaligned arrangement in the display substrate along the first direction so that not all of the plurality of second gap portions are collinear along the second direction.

6. The display substrate of claim 1, wherein the plurality of auxiliary black matrix blocks constitute one or more groups of auxiliary black matrix blocks;
    each of the one or more groups of auxiliary black matrix blocks comprises a plurality of auxiliary black matrix clusters arranged in a repeating pattern in the display substrate; and
    each of the plurality of auxiliary black matrix clusters comprises one or more of the plurality of auxiliary black matrix blocks.

7. The display substrate of claim 6, wherein at least two of the plurality of auxiliary black matrix blocks in a same one of the plurality of auxiliary black matrix clusters have different shapes.

8. The display substrate of claim 6, wherein areas of multiple ones of the plurality of auxiliary black matrix blocks arranged along a direction from the display area to the peripheral area and in a same one of the plurality of auxiliary black matrix clusters sequentially decrease.

9. The display substrate of claim 6, wherein
first gap portions of the plurality of first gap portions in each of the one or more groups of auxiliary black matrix blocks have a misaligned arrangement in the display substrate along a second direction different from the first direction so that not all of the first gap portions of the plurality of first gap portions in a same group of the one or more groups of auxiliary black matrix blocks are collinear along the first direction.

10. The display substrate of claim 9, wherein
second gap portions of the plurality of second gap portions in each of the one or more groups of auxiliary black matrix blocks have a misaligned arrangement in the display substrate along the first direction so that not all of the second gap portions of the plurality of second gap portions in a same group of the one or more groups of auxiliary black matrix blocks are collinear along the second direction.

11. The display substrate of claim 1, wherein the plurality of auxiliary black matrix blocks constitute a plurality of circles of auxiliary black matrix blocks sequentially arranged along a direction from the display area to the peripheral area, each of the plurality of circles of auxiliary black matrix blocks comprising multiple ones of the plurality of auxiliary black matrix blocks arranged encircling the black matrix.

12. The display substrate of claim 11, wherein the plurality of circles of auxiliary black matrix blocks comprise a first circle of auxiliary black matrix blocks and a second circle of auxiliary black matrix blocks directly adjacent to each other;
adjacent auxiliary black matrix blocks in the first circle of auxiliary black matrix blocks form a plurality of first gaps;
adjacent auxiliary black matrix blocks in the second circle of auxiliary black matrix blocks form a plurality of second gaps; and
any individual one of the plurality of first gaps is misaligned with respect to any of the plurality of second gaps.

13. The display substrate of claim 11, wherein areas of individual auxiliary black matrix blocks of the multiple ones of the plurality of auxiliary black matrix blocks in the plurality of circles of auxiliary black matrix blocks sequentially decrease along a direction from the display area to the peripheral area and across the plurality of circles of auxiliary black matrix blocks.

14. The display substrate of claim 11, wherein the multiple ones of the plurality of auxiliary black matrix blocks in a same one of the plurality of circles of auxiliary black matrix blocks have a substantially same shape and dimension.

15. The display substrate of claim 1, wherein the plurality of auxiliary black matrix blocks have a shape selected from a group consisting of a circular shape, a rectangular shape, a polygonal shape, and a mosaic shape.

16. The display substrate of claim 1, wherein the black matrix has a plurality of recesses along an outer boundary of the black matrix on a side of the black matrix distal to the display area.

17. The display substrate of claim 16, wherein at least a portion of each of the plurality of recesses has a stepped boundary.

18. The display substrate of claim 1, wherein the plurality of auxiliary black matrix blocks covers greater than 70% of an entire area of the outer peripheral region.

19. A display apparatus, comprising the display substrate of claim 1, and a printed circuit board connected to the display substrate.

* * * * *